T. MITCHELL.
Machine for Finishing Brush Handles.
No. 990. Reissued June 26, 1860.
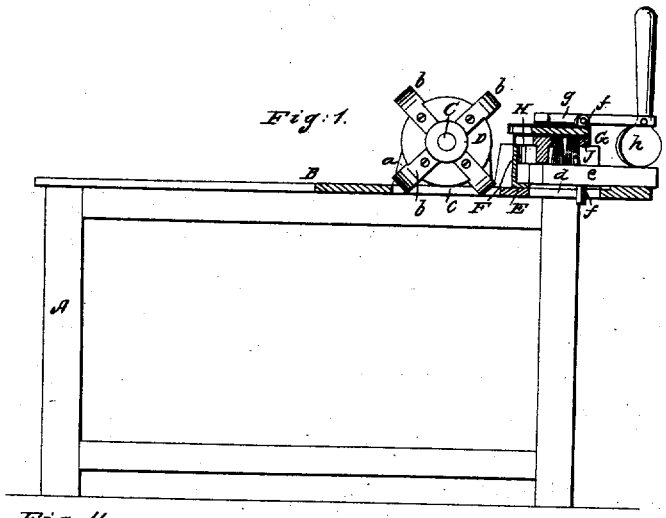
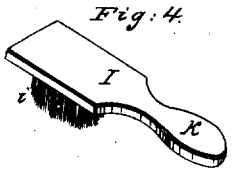
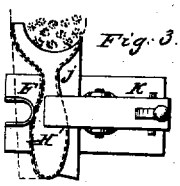
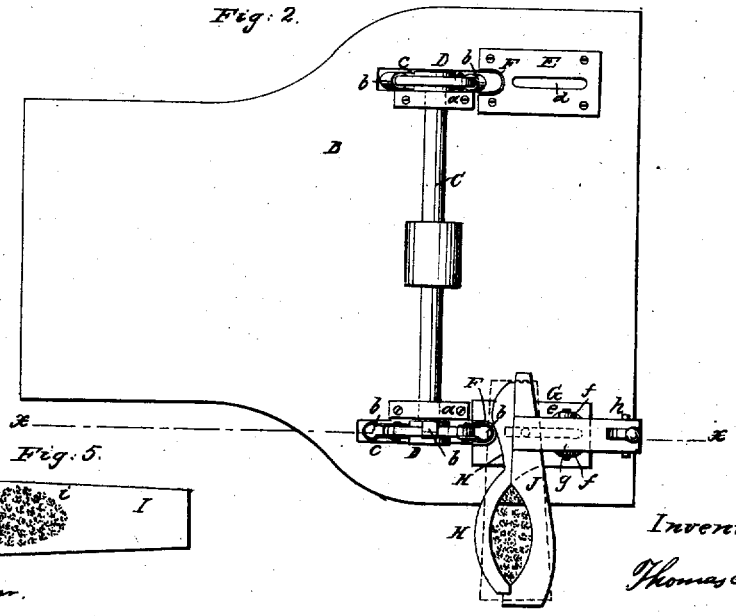
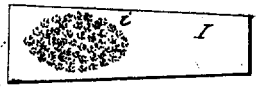
Witnesses:
Daniel King.
Thos A. Alexander.
Inventor:
Thomas Mitchell
N. PETERS. Photo-Lithographer, Washington, D. C.

UNITED STATES PATENT OFFICE.

THOMAS MITCHELL, OF LANSINGBURG, NEW YORK.

IMPROVED MACHINE FOR FINISHING HAIR-BRUSH HANDLES.

Specification forming part of Letters Patent No. 24,571, dated June 28, 1859; Reissue No. 885, dated January 17, 1860; Reissue No. 990, dated June 26, 1860.

*To all whom it may concern:*

Be it known that I, THOMAS MITCHELL, of Lansingburg, in the county of Rensselaer and State of New York, have invented a new and useful Improvement in the Making of Brushes; and I do hereby declare that the following is a full, clear, and exact description of the same, reference being had to the annexed drawings, making a part of this specification, in which—

Figure 1 is a side-sectional view of my invention, taken in the line *x x*, Fig. 2. Fig 2 is a plan or top view of the same. Fig. 3 is a detached plan or top view of one of the clamps and guides of the same. Fig. 4 is a detached perspective view of a brush having a portion of its stock or block shaped by my invention. Fig. 5 is a face view of a brush having an unfinished stock or block.

Similar letters of reference indicate corresponding parts in the several figures.

To enable those skilled in the art to fully understand and construct my invention, I will proceed to describe it.

A represents a rectangular frame which supports a platform, B, and C is a shaft which is placed in suitable bearings, *a a*, and transversely on the platform B.

On each end of the shaft C a cutter-wheel, D, is secured, the wheel being at the outer sides of the bearings *a a*, and to the periphery of each wheel D a series of cutters *b* are attached. The cutters *b* are of gouged form, and may be made of steel strips bent in semicircular form, with parallel ends, and attached to each side of the wheels, as shown clearly in Fig. 2. The bent portions of the cutters may be of flaring form, the front or cutting edges of the cutters being the larger ends, so as to permit the cutters to clear themselves or work freely during the cutting operation. Slots or openings *c* are made in the platform to allow the cutters to pass through in their rotation.

To the upper surface of the platform B, and directly in front of each cutter-wheel D, a metal plate, E, is secured. These metal plates are slotted longitudinally, as shown at *d*, and they are "let in" the platform so as to be flush with its upper surface. The platform B is slotted so as to correspond with the slots *d* in the plates E, and to the front end of each plate E a vertical guard and guide, F, is attached. These guards or guides are transversely of semicircular form, the concave sides being opposite the cutter-wheels D D, so as to serve as guards on the cutters *b*.

G, Figs. 1 and 2, is a clamp, which is formed of a block, *e*, having a pin, *f*, projecting from its under side, fitting in the slots *d* of the left-hand plate, E, the pin being allowed to slide freely in said slot. To the upper surface of the block *e* two uprights, *f f*, are attached, said uprights forming bearings for a plate or jaw, *g*, in the outer part of which an eccentric, *h*, is fitted. On the front part of the block *e* a curved pattern, H, is permanently secured, said pattern corresponding in form to the outer edge of one longitudinal half or any portion of a half of the brush stock or block I. The inner edge of the pattern H is made concave, corresponding to the curve of one-half of the bristles *i* of the brush. (See Fig. 2.)

J is a strip or plate, the inner edge of which adjoins the pattern H, the inner edge of the pattern and strip or plate corresponding inversely in form with each other. The inner edge of the pattern H has a flange or projection, *a*, at its upper edge. This flange extends beyond the side of the pattern H sufficiently to form a recess below it to receive the front part of the guard and guide F, as shown clearly in Fig. 1. The flange or projection $a^{\times}$ may be formed by attaching by solder or otherwise a strip to the upper part of the pattern, or the flange may be cast with the pattern. The unfinished brush is secured in the clamp G by placing its bristles *i* in the concave inner surface of the pattern H, and then adjusting the strip or plate J to the opposite side of the bristles and forcing the jaw *g* down on the block or stock I of the brush by actuating the eccentric *h*. By this arrangement the unfinished brush will be accurately centered in the clamp, the bristles *i* serving as a guide.

From the above description it will be seen that the bristles *i* are fitted in the block or stock I previous to the shaping of the same. When the unfinished brush is thus clamped, the clamp G is adjusted on the platform B, the pin *f*, being fitted in the slot *d*, and the face of the pattern H being pressed against the guard and guide F, the operator moves the clamp so that the cutters *b*, as the wheels D rotate, will cut the edge of the block or stock of a form corresponding to the face side of the pattern H, the pattern as it moves along being kept against the guard and guide, the flange $a^x$ projecting over it, as shown clearly in Fig. 1. It will be observed that the cutters cut at right angles to the grain of the wood of which the stock is composed. The said cutters are thus enabled to enter or make very fine and intricate configurations in the stock without tearing or injuring the same. A rotary cutter placed upon a vertical mandrel, and revolving horizontally with or nearly in line with the grain of the wood, has been before used and is disclaimed. This construction is only employed for coarse work and is not adapted to the cutting of fine configurations, because a reduction of the diameter of the vertical mandrel and cutters below a diameter of two inches would render the same too weak for safe use, and the aforesaid limit of diameter—viz., two inches—permits of the cutting of no recess in the brush-handle of a less width, which is much too large for the proper ornamentation of a small article like a hair-brush; but in practice it is found impossible to use the vertical mandrel for configurations of less sweep than twelve inches, because in cutting against the grain of the wood the latter is splintered and torn to such a degree as to be rendered useless.

In the patent granted to me June 23, 1857, a revolving disk-cutter somewhat like a circular saw is employed, the teeth being bent to an angle and provided with broad chisel-shaped cutting-edges. This method is attended with the same defects and difficulties as those described above in connection with the vertical mandrel. The disk-cutters are only capable of cutting straight edges and convex surfaces. They will not enter or cut corrugations, because to do this they must act sidewise upon the wood, and of such action they are incapable, because the wood is thus carried away out of the reach of the cutters. Much of the wood used for hair-brushes is of a costly character—such as rose and satin wood—so that machines of the above kind cannot be usefully employed thereupon. Such devices are chiefly employed in the manufacture of scrubbing-brushes and other coarse goods made of cheap woods, with sides cut upon large sweeps.

The flange $a^x$ of the pattern H forms an important feature of the invention, for by its use the cutters *b* are prevented from coming in contact with the guard and guide F, and at the same time they are allowed to work or rotate in such a relative position with the block or stock that the edge of the latter will be cut vertically, or nearly so. The flange also serves as a support to the bottom edge of the block or stock, and prevents said edge being torn by the action of the cutters, a smooth cut being insured. When one side of the block or stock I is cut, it is removed from the clamp G and secured in a clamp, K, Fig. 3, which is constructed like clamp G, with the exception that the strip or plate J is not used, the brush not being centered by the bristles *i*, but by means of the finished side of the block or stock, which abuts against a curved edge, *j*, as shown in Fig. 3, the pattern H′ of clamp K corresponding to that of H of clamp G. In case the handles *k* (see Fig. 4) of the brushes are only shaped by the machine, the pattern H is only made of a corresponding length, but an extension H″ would be required on the clamp G in order to permit of the centering of the brush by the bristles *i*. The clamps in the drawings are shown as being thus formed, the pattern H′ of clamp K in Fig. 3 corresponding with the length of the handle *k*, and the part H″ in Fig. 2 being an extension to allow the brush to be centered in the clamp. The clamp K has its pin fitted in the slot in the right-hand plate, E, and is manipulated in the same way as the clamp G, in order to cut the remaining side of the stock or block.

By this invention the stocks or block I of brushes may be readily shaped and the work performed in a very uniform manner.

Having thus described my invention, what I claim as new, and desire to secure by Letters Patent, is—

1. The employment, in combination with the brush-clamp G or pattern H, or their equivalents, of a wheel, D, which is provided with V, or gouge shaped cutters *b*, or their equivalents, and which act upon the wood, substantially as and for the purposes herein shown and described.

2. The combination, with the pattern H, (of the brush clamp,) of a supporting ledge or projection, $a^x$, or its equivalent, as and for the purpose herein shown and described.

3. The combination of the guide F with the pattern H and cutter D, as and for the purpose herein shown and described.

4. Centering the unfinished brushes in the clamp G by means of the bristles *i*, in connection with the strip or plate J and the inner curved edge, H, or its extension H′, substantially as described.

THOMAS MITCHELL.

Witnesses:
DANIEL KING,
JOHN M. MURRAY.